US012456237B2

(12) United States Patent
Zaides et al.

(10) Patent No.: US 12,456,237 B2
(45) Date of Patent: Oct. 28, 2025

(54) SKELETONIZATION OF MEDICAL IMAGES FROM INCOMPLETE AND NOISY VOXEL DATA

(71) Applicant: BIOSENSE WEBSTER (ISRAEL) LTD., Yokneam (IL)

(72) Inventors: Leonid Zaides, Atlit (IL); Fady Massarwa, Baka al Gharbiyya (IL); Lior Zar, Poria Illit (IL)

(73) Assignee: BIOSENSE WEBSTER (ISRAEL) LTD., Yokneam (IL)

( * ) Notice: Subject to any disclaimer, the term of this patent is extended or adjusted under 35 U.S.C. 154(b) by 906 days.

(21) Appl. No.: 17/687,802

(22) Filed: Mar. 7, 2022

(65) Prior Publication Data

US 2023/0281891 A1 Sep. 7, 2023

(51) Int. Cl.
| | | |
|---|---|---|
| G06T 7/11 | (2017.01) | |
| G06T 7/00 | (2017.01) | |
| G06T 7/143 | (2017.01) | |
| G06T 11/00 | (2006.01) | |
| G06V 10/25 | (2022.01) | |
| G06V 10/44 | (2022.01) | |
| G06V 10/46 | (2022.01) | |

(Continued)

(52) U.S. Cl.
CPC ............ *G06T 11/008* (2013.01); *G06V 10/25* (2022.01); *G06V 10/457* (2022.01); *G06V 10/476* (2022.01); *G06V 10/771* (2022.01); *G06V 10/7715* (2022.01); *G06T 2211/424* (2013.01)

(58) Field of Classification Search
None
See application file for complete search history.

(56) References Cited

U.S. PATENT DOCUMENTS 8,456,182 B2 * 6/2013 Bar-Tal .................. A61B 5/283
600/509
10,593,112 B1 3/2020 Zar
(Continued)

FOREIGN PATENT DOCUMENTS

CN 105916455 A * 8/2016 ............. A61C 1/084
CN 106530314 A * 3/2017
(Continued)

OTHER PUBLICATIONS

Kerautret et al., "Centerline Detection on Partial Mesh Scans by Confidence Vote in Accumulation Map," 23rd International Conference on Pattern Recognition (ICPR), Dec. 2016.
(Continued)

*Primary Examiner* — Mohammed Rachedine
(74) *Attorney, Agent, or Firm* — Clayton, McKay & Bailey, PC

(57) ABSTRACT

A method for generating a skeleton in an image of a cavity of an organ of a body includes receiving a map of the cavity, the map including surface voxels and interior voxels. A subset of the interior voxels is generated, of candidate locations to be on the skeleton. The subset is pruned by removing outlier candidate locations. Using a geometrical model including a statistical model, the candidate locations remaining in the pruned subset are spatially compressed. The compressed candidate locations are connected to produce one or more centerlines of the skeleton. At least the skeleton is displayed to user.

22 Claims, 4 Drawing Sheets

(51) Int. Cl.
  *G06V 10/77* (2022.01)
  *G06V 10/771* (2022.01)

(56) References Cited

U.S. PATENT DOCUMENTS

| | | | | |
|---|---|---|---|---|
| 2004/0264754 A1* | 12/2004 | Kleen | ................ | A61B 1/041 |
| | | | | 382/128 |
| 2018/0349724 A1* | 12/2018 | Xiang | ................ | G06T 7/0012 |
| 2019/0164282 A1* | 5/2019 | Gliner | ................ | G06T 7/0012 |

FOREIGN PATENT DOCUMENTS

| | | | | |
|---|---|---|---|---|
| CN | 107320221 A | * | 11/2017 | ............ B33Y 10/00 |
| WO | WO-2016151062 A1 | * | 9/2016 | ........... A61B 1/0638 |

OTHER PUBLICATIONS

Tagliasacchi et al., "Curve Skeleton Extraction from Incomplete Point Cloud," ACM Transactions on Graphics, vol. 28, Issue 3, Article No. 71, pp. 1-9, Aug. 2009.

International Search Report for corresponding PCT Appln. No. PCT/IB2023/051776 dated Jun. 6, 2023.

Matthias Hoffmann et al: "Automatic Detection of Ostia in the Left Atrium" In: "Informatik Aktuell." Jan. 1, 2016 (Jan. 1, 2016), Springer Verlag, London., GB, XP055389191, pp. 224-229.

\* cited by examiner

SKELETONIZATION OF MEDICAL IMAGES FROM INCOMPLETE AND NOISY VOXEL DATA

FIELD OF THE DISCLOSURE

The present disclosure relates generally to electroanatomical (EA) mapping, and particularly to algorithms for improving cardiac EA maps.

BACKGROUND OF THE DISCLOSURE

Methods for generation of an improved EA map of a cavity of an organ were previously proposed in the patent literature. For example, U.S. Pat. No. 10,593,112 describes chamber reconstruction from a partial volume. The method has a plurality of coordinates mapped to respective first voxels. Each first voxel is assigned a first range of values having a maximal first value. A plurality of second voxels, each of which is at a given distance voxel range from a nearest first voxel, are assigned respective second values. Each of at least some of the second voxels is then iteratively assigned a weighted average of respective values of its immediate neighbors, any value differing from the maximal first value by not more than a first threshold being given a higher weight than any other value. A subset of the second voxels, each of which has a value differing from the maximal first value by more than a second threshold, are identified. Subsequently, a mesh representing a surface of a volume including the first voxels and the subset of the second voxels is generated.

Methods for generating centerlines of geometrical objects were previously reported. For example, in the conference paper titled, "Centerline Detection on Partial Mesh Scans by Confidence Vote in Accumulation Map," 23$^{rd}$ International Conference on Pattern Recognition (ICPR), December 2016, Kerautret et al. describe a method for extracting the centerline of 3D objects given only partial mesh scans as input data. Its principle relies on the construction of a normal vector accumulation map built by casting digital rays from input vertices. This map is then pruned according to a confidence voting rule: confidence in a point increasing if this point has maximal votes along a ray. Points with high confidence accurately delineate the centerline of the object. The resulting centerline is robust enough to allow the reconstruction of the associated graph by morphological processing of the confidence and a geodesic tracking. The overall process is unsupervised and only depends on a user-chosen maximal object radius.

As another example, in the conference paper titled, "Curve Skeleton Extraction from Incomplete Point Cloud," ACM Transactions on Graphics, Volume 28, Issue 3, August 2009 Article No. 71, pp 1-9, Tagliasacchi et al. describe an algorithm for curve skeleton extraction from imperfect point clouds where large portions of the data may be missing. The construction is primarily based on generalized rotational symmetry axis (ROSA) of an oriented point set. The formulation utilizes normal information to compensate for the missing data and leads to robust curve skeleton computation over regions of a shape that are generally cylindrical. An iterative algorithm is presented via planar cuts to compute the ROSA of a point cloud. This is complemented by special handling of non-cylindrical joint regions to obtain a centered, topologically clean, and complete 1D skeleton. Curve skeletons can be extracted this way from a variety of shapes captured by incomplete point clouds.

BRIEF DESCRIPTION OF THE DRAWINGS

The present disclosure will be more fully understood from the following detailed description of the examples thereof, taken together with the drawings in which.

DETAILED DESCRIPTION OF EXAMPLES

Overview

Figure 1:
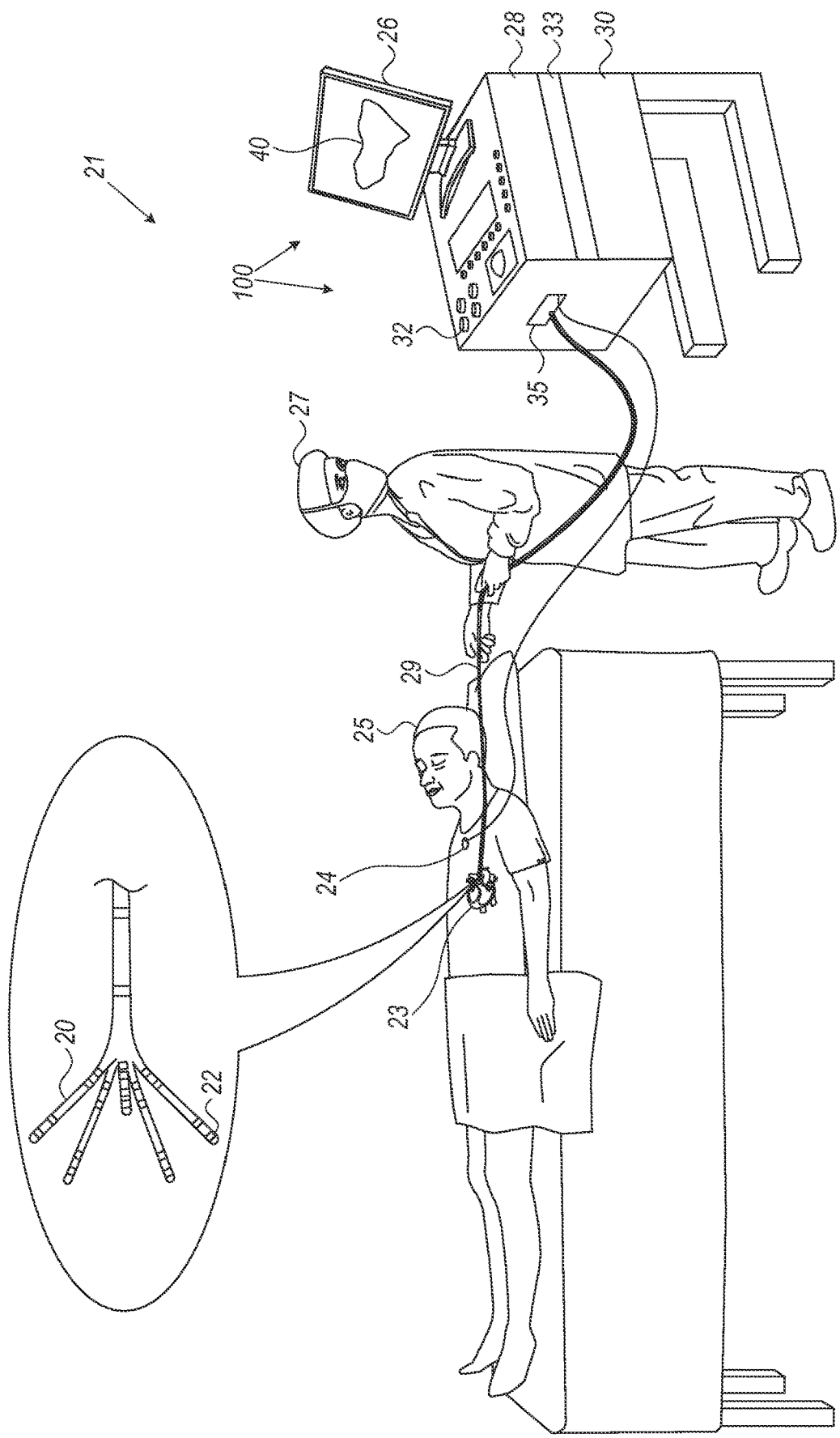
FIG. 1 is a schematic, pictorial illustration of a system for electroanatomical (EA) mapping, in accordance with an example of the present disclosure.

A cavity of an organ of a patient, such as a cardiac cavity, also called hereinafter cardiac chamber, can be mapped (e.g., electroanatomically mapped) using a mapping catheter having one or more suitable sensors, such as electrodes, fitted at its distal end for mapping within the organ. Using location signals generated by the various sensors, a processor may calculate the sensor locations within the organ (e.g., the locations of sensing electrodes inside the cardiac cavity). Using the calculated locations, the processor may further derive an anatomical map of the cavity surface. In case of a cardiac cavity (e.g., cardiac chamber), the processor may derive an electroanatomical (EA) map of the cavity surface.

A geometrical skeleton (also known as a medial axis) of such an EA map is a simplified representation of the EA map. The skeletonization is valuable since its simplified form (compared to the whole map) can be used for tasks such as automatic identification/segmentation of EA map portions displayed to a physician, which improves EA map resolution, and generates different views of the EA map.

However, volume data obtained from catheter movements in the cardiac chamber is often incomplete and highly noisy. These factors, together with the fact that a scanned volume varies between cases, means that a skeletonization algorithm may give a poorly calculated (e.g., highly inaccurate) skeleton. Specifically, a skeletonization algorithm typically has two parts prone to error, one part that computes scatter points that may belong to a medial (skeleton) center line, and another part that attempts to connect the scatter points to produce the skeleton. If the scatter points are distributed in an incoherent manner, the points cannot be connected into a well-defined skeleton.

Examples of the present disclosure that are described hereafter provide algorithms that derive well-defined skeletons for variable volume shapes, including where the volume data is incomplete, highly noisy, and which contain points not only on the volume boundary but also internally. As such, the disclosed techniques are highly effective in skeletonization of cardiac EA maps.

In one example, a disclosed algorithm initially determines, for example using the method reported in the aforementioned U.S. Pat. No. 10,593,112, boundary voxels of a volume (so that no holes remain within in volume), so as to define a surface of the volume (e.g., defining a surface of an EA map).

Then, using a preliminary algorithm, such as, for example, the algorithm of Kerautret et al., a processor calculates normal lines to the surface (lines that are perpendicular to the surface). Locations where the normal lines meet, or cross sufficiently near one another, provide an indication of candidate points on a medial line.

Specifically, the disclosed algorithm uses, in a preliminary algorithm of Kerautret et al., the aforementioned confidence measure defined therein, to select candidate locations that may be connected to form a medial line. Alternatively to Kerautret et al., the algorithm may use the aforementioned ROSA-based method to generate candidate locations. Both papers describe how the produced points are connected. However, both methods (i.e., preliminary algorithms) of Kerautret et al., and of Tagliasacchi et al. by their own produce insufficient results (e.g., a subset of the volume interior voxels that can lead only to inconclusive skeletons of a cardiac chamber).

To overcome the limitation of both of these preliminary algorithms, the disclosed technique further applies the disclosed steps (e.g., on top of any of the algorithms of Kerautret et al., and of Tagliasacchi et al.) to generate a consistent (and therefore connectable) set of candidate locations, as follows:

1. Filtering out (e.g., pruning) outlier candidate locations that are likely (e.g., based on a criterion) far away from a center of the volume (near the boundary of the reconstruction). The pruning step generates a pruned subset of candidate locations.

A processor may apply several possible filters to that end:
   a. Angle dispersion filter: Any real centerline points should be hit from different angles of the geometry circumference. The disclosed algorithm includes a test to identify and accept only higher dispersion angles. To this end, the method includes estimating an angular dispersion of its generative surface voxels and pruning (e.g., removing) the candidate location if the angular dispersion is below a given minimal dispersion value. In the context of the disclosed description, the term "generative surface voxels of a given candidate location" refers to a plurality of surface voxels, whose normal lines to the surface cross each other inside the volume to define the given candidate location of the skeleton, as exemplified in FIG. 4.

An alternative may be checking a spatial spread of normal vectors over the surface. If the hitting vectors lie within a limited surface map area, there is a high likelihood of a local bump in the surface where the normal lines (i.e., normal rays) are constructed, and as a result their intersection inside the volume is an outlier data point.

c. Hit distance variance: A hit distance of a centerline candidate location is the distance between the origin of a hitting vector on the surface and the candidate. For an ideal cylindrical cut the hitting distance variance is zero. For an elliptical cut this variance is bound by length difference between the minor and major axes of the ellipse. For non-centerline points, the variance between hitting radii is greater than that of the ideal cylindrical cut. A datapoint associated with a variance above a threshold is therefore rejected as a centerline location.

2. Optimizing centerline candidates by "pushing" them toward a tentative centerline. To this end, the method uses a geometrical model comprising a statistical model that spatially compresses the remaining candidate locations. Specifically, for each remaining centerline candidate location, the processor accounts for all of the originating surface voxels whose ray hits or crosses sufficiently close to the candidate location. The processor computes an average hit distance for all of the surface voxel origins and performs a correction for the candidates such that the distance from all the origins is the average distance. This optimization step on the location of the candidate location cannot satisfy all of the points, so the processor performs minimization of error (in this case, the error is the cumulative difference between current candidate origin distance to the target average distance).

Additionally, to include more surface locations on all sides of circumference around the candidate location, the processor takes surface voxels on the opposite sides of the origins. The described compression, or "pushing" towards a tentative centerline, is done in a continuous 3D space which is not bound to a voxel grid.

While the candidate locations after this step are still dispersed and are not represented (e.g., uniquely connectable) by a 1D curve, their center of mass is centralized, making this a very good preparation for the next step.

3. Principal Component Analysis (PCA) based spatial compression of variability in candidate locations. This step may alternatively be performed using related methods, such as regression analysis.

When using PCA, for each candidate location (with modified location after step (2) above) the processor finds a neighborhood of candidate locations within a pre-defined radius. The processor applies PCA analysis to infer the direction of the local point cloud and its center of mass. The processor constructs a line starting at the center of mass which points toward the first component. Then the processor projects the candidate location to this line (the closest point on the line to the candidate locations).

In one example, the processor performs several iterations of PCA contraction, each iteration spatially compressing (e.g., performing contraction on) all candidate locations. To account for both local and global direction changes of the point cloud, the processor performs multi-contractions, such that each iteration is tested on several radii, given in ascending order, using the calculation on the radius for which the directionality of the point cloud is the most pronounced. The test for directionality is the ratio of primary component to the sum of all components. If the ratio is above a given value (e.g., 0.85) the iterative compression ends, since such a ratio means that, for this locality, the directionality is very pronounced. The described contraction produces final candidate centerline locations that lend to a simply connectable 1D curve.

In some examples, the processor further finds a root location of the skeleton: a centerline point that satisfies certain properties, including proximity to the center of the reconstruction, location around points with orientation aligned with primary orientation of the reconstruction, and not being isolated. The centerline point is chosen according to a weighted sum of these measurements. Both a center of reconstruction and its first component are computed from the surface of the reconstruction.

The above steps 1-3 provide easily connectable skeleton locations which allows the processor to generate very well-defined skeletons by connecting these locations (e.g., piecewise with lines or by best fitting a curve). As seen below, the results can be easily clinically interpreted and/or used as a basis for the further aforementioned applications.

System Description

FIG. 1 is a schematic, pictorial illustration of a system 21 for electroanatomical (EA) mapping, in accordance with an example of the present disclosure. FIG. 1 depicts a physician 27 using a Pentaray® EA mapping catheter 29 to perform an EA mapping of a heart 23 of a patient 25. Catheter 29 comprises, at its distal end, one or more arms 20, which may be mechanically flexible, each of which is coupled with one or more electrodes 22. During the mapping procedure, electrodes 22 acquire and/or inject unipolar and/or bipolar signals from and/or to the tissue of heart 23.

A processor 28 in a console 30 receives these signals via an electrical interface 35, and uses information contained in these signals to construct an EA map 40 that processor 28 stores in a memory 33. During and/or following the procedure, processor 28 may display EA map 40 on a display 26, or display at least at least the skeleton generated by the disclosed technique, such that is shown in FIG. 3. User controls 32 of a user interface 100 enable physician 27 to communicate with processor 28 and command editing and/or highlighting portions of EA map 40. Controls 32 may include, for example, a trackball and control knobs, as well as a keyboard. Other elements of user interface 100 may include touch screen functionality of display 26.

During the procedure, a tracking system is used to track the respective locations of sensing electrodes 22, such that each of the signals may be associated with the location at which the signal was acquired. For example, the Active Catheter Location (ACL) system, made by Biosense-Webster (Irvine California), which is described in U.S. Pat. No. 8,456,182, whose disclosure is incorporated herein by reference, may be used. In the ACL system, a processor estimates the respective locations of the electrodes based on impedances measured between each of the sensing electrodes 22, and a plurality of surface electrodes 24, that are coupled to the skin of patient 25. For example, three surface electrodes 24 may be coupled to the patient's chest, and another three surface electrodes may be coupled to the patient's back. (For ease of illustration, only one surface electrode is shown in FIG. 1.) Electric currents are passed between electrodes 22 inside heart 23 of the patient and surface electrodes 24. Processor 28 calculates an estimated location of all electrodes 22 within the patient's heart based on the ratios between the resulting current amplitudes measured at surface electrodes 24 (or between the impedances implied by these amplitudes) and the known locations of electrodes 24 on the patient's body. The processor may thus associate any given impedance signal received from electrodes 22 with the location at which the signal was acquired.

The example illustration shown in FIG. 1 is chosen purely for the sake of conceptual clarity. Other tracking methods can be used, such as those based on measuring voltage signals. Other types of sensing catheters, such as the Lasso® Catheter (produced by Biosense Webster) or a basket catheter may equivalently be employed. Contact sensors may be fitted at the distal end of EA mapping catheter 29. As noted above, other types of electrodes, such as those used for ablation, may be utilized in a similar way and fitted to electrodes 22 for acquiring the needed location data. Thus, an ablation electrode used for collecting location data is regarded, in this case, as a sensing electrode. In an optional example, processor 28 is further configured to indicate the quality of physical contact between each of the electrodes 22 and an inner surface of the cardiac chamber during measurement.

Processor 28 typically comprises a general-purpose computer with software programmed to carry out the functions described herein. In particular, processor 28 runs a dedicated algorithm as disclosed herein, including in FIG. 5, that enables processor 28 to perform the disclosed steps, as further described below. The software may be downloaded to the computer in electronic form, over a network, for example, or it may, alternatively or additionally, be provided and/or stored on non-transitory tangible media, such as magnetic, optical, or electronic memory.

Skeletons Obtained Using Preliminary Vs. Disclosed Algorithms

Figure 2A:
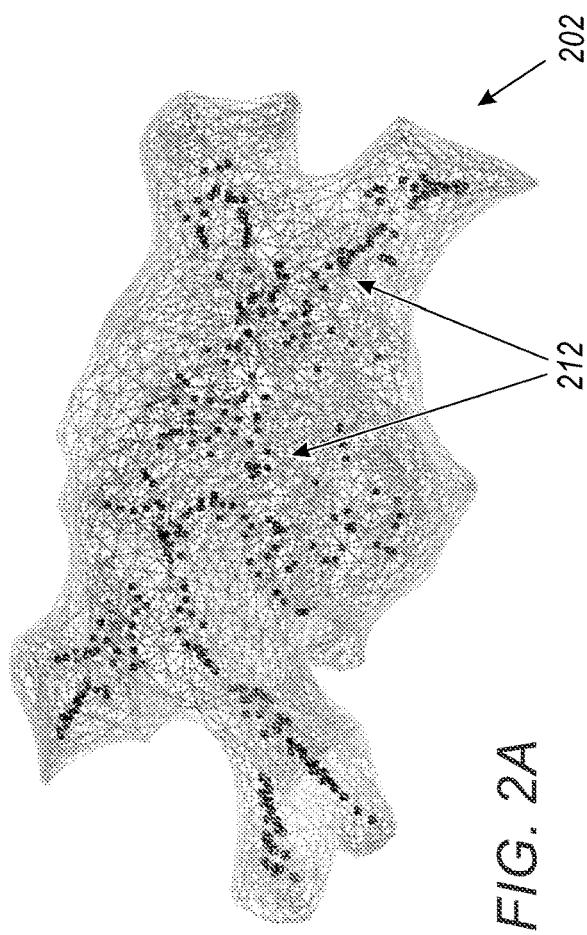
FIGS. 2A and 2B are EA maps of left atria comprising respective candidate locations on a skeleton, the locations obtained by applying a preliminary algorithm, in accordance with an example of the present disclosure.
Figure 2B:
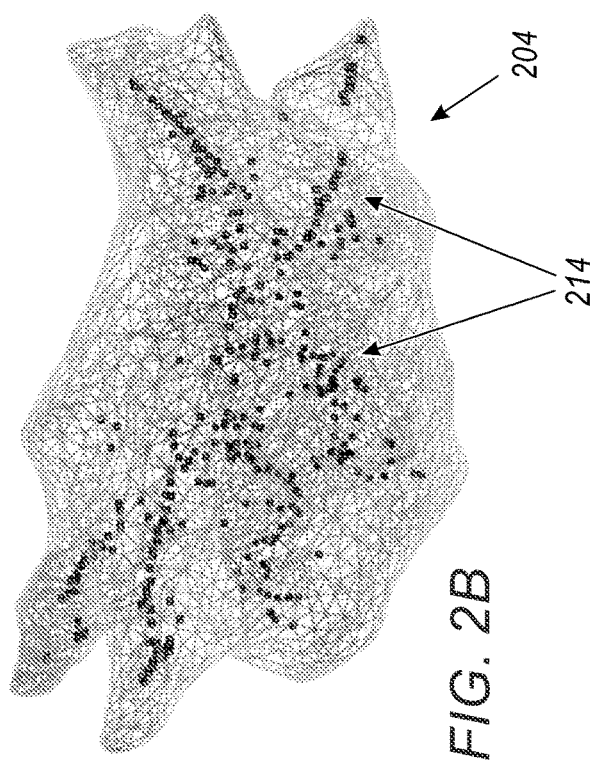

FIGS. 2A and 2B are EA maps (202, 204) of left atria comprising respective candidate locations (212, 214) to be on a skeleton, the locations obtained by applying a preliminary algorithm, in accordance with an example of the present disclosure. As seen, due to the complicated left atrium shapes, the resulting candidate locations (212, 214) cannot be connected to obtain a comprehensive and accurate skeleton.

Figure 3A:
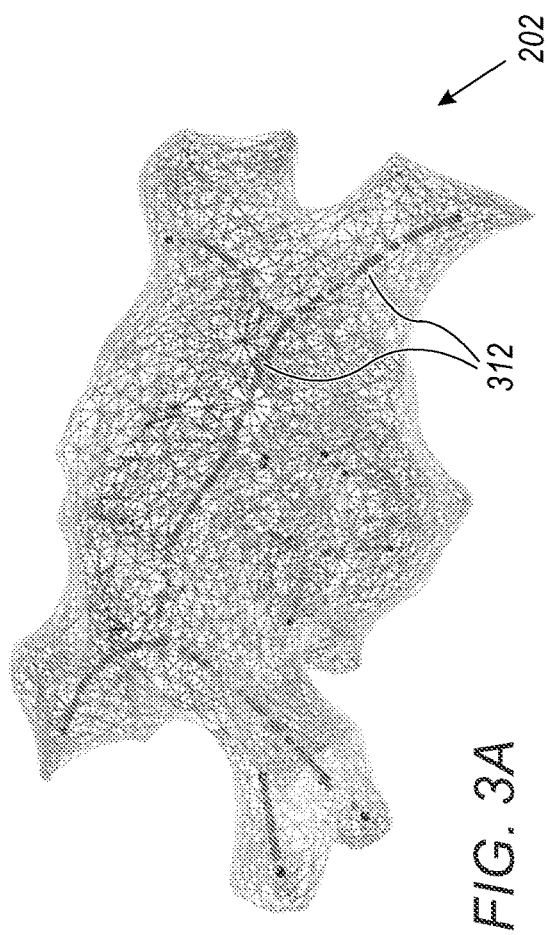
FIGS. 3A and 3B are the EA maps of FIGS. 2A and 2B comprising skeletons obtained from the candidate locations by applying a skeletonization algorithm, in accordance with an example of the present disclosure.
Figure 3B:
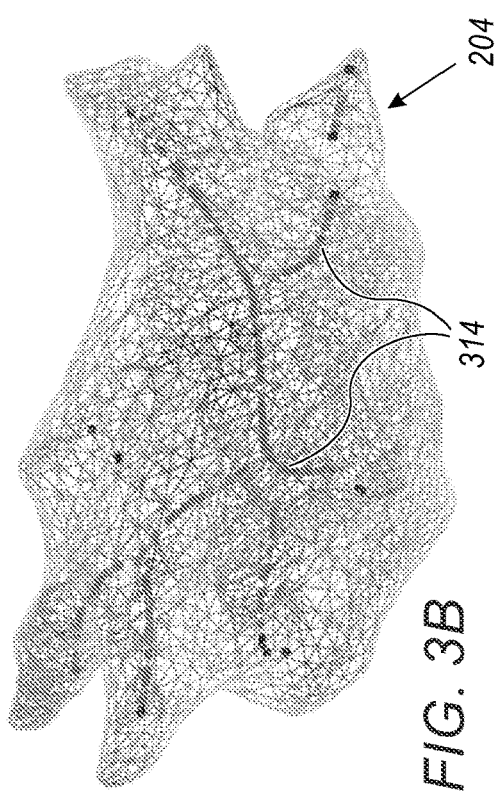

FIGS. 3A and 3B are the EA maps (202, 204) of FIGS. 2A and 2B comprising skeletons (312, 314) obtained from the candidate locations (212, 214) by applying a skeletonization algorithm, in accordance with an example of the present disclosure. As seen, the disclosed technique, which is applied on top of the results of FIGS. 2A and 2B, is able to generate comprehensive and accurate skeletons (312, 314) of the left atria. An example of algorithm steps used to obtain skeletons (312, 314) obtained from the candidate locations (212, 214) is described in FIGS. 4 and 5 below.

Figure 4:
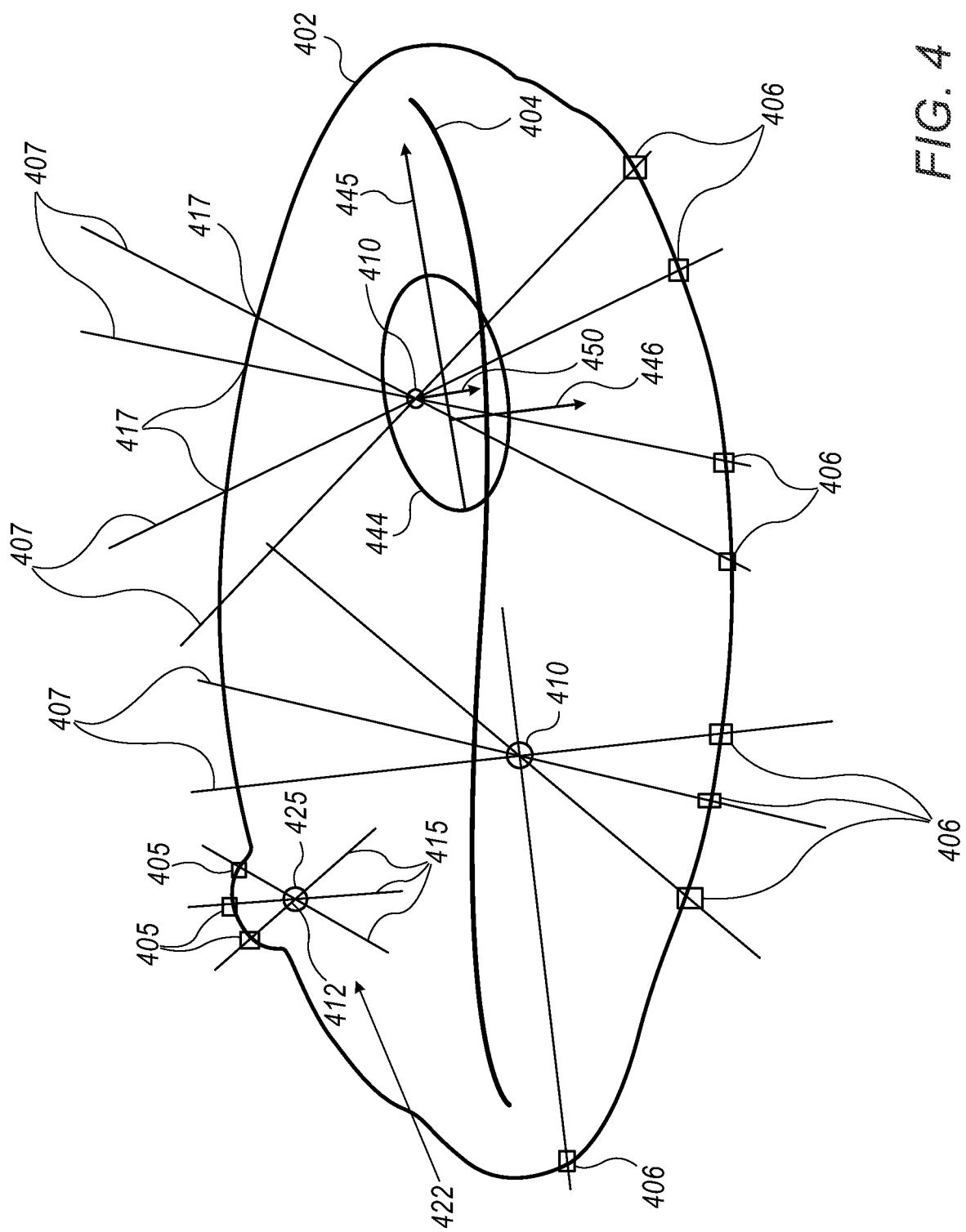
FIG. 4 is a schematic drawing that describes how a disclosed skeletonization algorithm obtains the skeletons of FIGS. 3A and 3B from respective candidate locations of FIGS. 2A and 2B, in accordance with an example of the present disclosure.

Skeletonization Algorithm for Medical Applications from Incomplete and Highly Noisy Voxel Data FIG. 4 is a schematic drawing that describes how a disclosed skeletonization algorithm obtains skeletons (312, 314) of FIGS. 3A and 3B from respective candidate locations (212, 214) of FIGS. 2A and 2B, in accordance with an example of the present disclosure.

FIG. 4 shows an EA map 402, which was obtained using the algorithm of the aforementioned U.S. Pat. No. 10,593, 112. A preliminary algorithm, such as the algorithm of Kerautret et al., was applied to EA map 402 to obtain candidate location of a skeleton, such as locations 410 and 412.

In a next step, the disclosed algorithm filters out outlier skeleton candidate points. The algorithm filters out points that are clearly far away from a center (near the boundary of the reconstruction). An example of such a detected and filtered out point is of location 412.

To identify points such as point 412, the algorithm applies two filters:

A. Angle dispersion filter: The centerline points should be hit from different angles of the geometry circumference. If the hitting vectors 415 surface crossing (405) lie in the same volume 425 there is a high likelihood of a local bump and, as a result, an outlier point. The algorithm tests for higher dispersion angles. For example, there are two possible options to test if there is a normal hit only from a narrow neighborhood of origin:

Option I
   A1) Pair several of the hitting vectors and make a cross product between the vectors in each pair.
   A2) Sum the cross-product outputs and normalize: a proxy of a normal plane through the origins.

A3) Project the ray vectors to a plane originated at the candidate with the found normal.

A4) Compute the angles (relative to an x-axis) of the projected points and compute its variance. If the variance is below given threshold it is filtered out.

Option II

A5) Compute the average direction of hitting vectors.

A6) Compute the maximal angle between the hitting vectors and the average vector.

A7) If the maximal hitting angle is below a certain threshold it is filtered out.

B. Hit distance variance 422. Hit distance of a centerline candidate is the distance between the origin of a hitting vector and the candidate. For an ideal cylindrical cut the variance of hitting distances is 0. For an elliptical cut this variance is bound by length difference between its minor and major axes. For non-centerline points the variance 422 between hitting radii is greater than a given allowable variance.

A way to construct a hit radius variance filter is to consider hit distance as a Euclidean distance between a centerline and an origin whose ray (normal direction of the surface origin) hits the centerline point. A point on the centerline exhibits relatively small variance of its hit distances. Therefore, if the variance 422 is above a certain threshold, the point is considered to be far from a centerline.

Because the local cardiac chamber cross section is more elliptical than circular, as well as because the spatial noise of the generative surface voxel (406) data, the directional noise in normal vectors (407) used therein result in candidate centerline points 410 that do not fall exactly on a centerline to be found, but rather lie around it with significant variance (although quite far from the borders). The next step therefore, is to "push" remaining candidate locations (i.e., points 410) toward the as yet unknown centerline (404) in the vicinity of a skeleton.

The pushing step relies on the observation that the push direction can be statistically derived. This assumption is based on FIGS. 2A and 2B and 3A and 3B. Statistically, therefore, the local distribution of points 410 conforms with a directionality of the sought-after centerline, e.g., within each ROI 444, the point cloud inside ROI 444 with a principal axis 445 parallel to the centerline. Thus, the algorithm applies a preliminary PCA on candidates by pushing them normally (e.g., along a secondary axis 446) to the locally found principal axis (445) within ROI 444.

To find a magnitude of the push for each centerline candidate point 410 (e.g., to find a magnitude of a push vector 450 parallel to push direction of a secondary axis 446), the algorithm considers all the generative surface voxels 406 whose rays 407 (i.e., rays normal to the surface originating from surface voxels 406) hit the candidate. The algorithm computes the average hit distance for all the origins and moves the candidate point 410 by a magnitude resulting in the distance of the point 410 from all the origins 406 (i.e., generative surface voxels 406) to be the average distance. This optimization step on the location of the candidate cannot satisfy all of the points, so the algorithm runs a minimization of error calculation (e.g., minimizes an error in the cumulative difference between current candidate-origin distance to the target-average distance).

Additionally, to include more points on all sides of a circumference around the candidate, the algorithm takes surface voxels (417) on the opposite sides of the origins 406. To this end, for each surface voxel 406 the algorithm shoots a ray 407 in the reversed normal direction (inwards) and finds ray 407 intersection with the surface. Ray grid traversal can be done using one of the ray tracing algorithms known in the art.

This push is in 3D space and is not bound to a voxel grid.

As a detailed example of the above-described pushing step consider an optimization step in which the algorithm assumes that any centerline point should be equidistant from the hitting origins.

One way of computing the optimized location is to minimize a distance:

$$d = ((O_x^j - P_x)^2 + (O_y^j - P_y)^2 + (O_z^j - P_z)^2 - R^2)^2$$

where $O^j$ is the $j^{th}$ origin, P is the computed centerline point, and R is a target radius. In the given example, R is approximated as the average of a set $\{R_k\}$ of all the hitting origins: the algorithm finds that the distance between each origin 406 and the respective hit point 417 is the surface origin's hit diameter. The algorithm designates surface voxel radius, $R_k$, as half of its hit diameter. Also, for each surface voxel, the algorithm stores the coordinates of the opposite surface voxel. The average surface voxel radius, R, is a pseudo measurement for distance between any interior voxel location 410 and the closest point on the centerline.

Additional details of the example algorithm are:

For each centerline point $c_0$ let $\{O\}$ be a set of origins whose ray hits $c_0$.

Let $\{OO\}$ be the set of surface voxels opposite to the origins in $\{O\}$ (e.g., set of surface locations 417 opposite to surface locations 406 in FIG. 4).

The algorithm finds the radius R by averaging the hit distances of origins in $\{O\}$.

Then the algorithm obtains a set of centerline neighbors such that the distance between CN (centerline point neighbor) and $c_0$ is less than a small radius.

The algorithm runs PCA analysis on the local neighbors of $c_0$ and obtains the main dispersion direction of the points by taking the first component.

For each origin point o in $\{O\}$, the algorithm tests orthogonality between the hitting vector ($o$–$c_0$) and the normalized first component. The condition checked is $$\text{abs}(\text{dot}(\text{normalize}(o\text{–}c_0), \text{first component})) < \text{threshold}$$

By way of example, a threshold of 0.6 is used, which means that the algorithm restricts the origins whose angle between incident vector to candidate first component of vector to $c_0$ is less than 53°. For origins 410 (i.e., that are not filtered out) the algorithm adds their locations to a new set $\{F\}$.

For each origin that was added to $\{F\}$ the algorithm tests whether its opposite surface voxel $oo \in \{OO\}$ can be added to F as well. The algorithm tests that:

$$d(o, oo) < R * \text{coeff}$$

$d(o, oo)$ is Euclidean distance between o and oo

We use coeff=3.

R should be around ½ of the distance between o and oo so the algorithm allows filtering out opposites whose distance to origin is more than three times the average radius.

The opposite that passes this test is added to $\{F\}$.

The processor runs the algorithm to perform a minimization step with gradient descend where the loss function is:

$$l = \sum_{o \in F} ((O_x^j - P_x)^2 + (O_y^j - P_y)^2 + (O_z^j - P_z)^2 - R^2)^2$$

The algorithm then optimizes P. The algorithm uses a given number (e.g., 30) of iterations with a given learning rate (e.g., 0.5) to ensure that the "push" step is convergent (e.g., the most accurate). For each centerline point the algorithm uses the optimized location. Note the number of iterations may vary, including using less iterations if calculation converges, by, for example, meeting a stop criterion defined by one of difference in spatial movement between successive iterations, or difference in a loss function iterations between successive iterations, being below a threshold.

While the point 410 locations after this "pushing" step are still dispersed and do not represent a 1D curve of a skeleton, their center of mass is centralized and it makes a very good preparation for the next, iterative PCA, step.

At the next iterative PCA step, for each candidate location (with modified locations after the "push" step) the algorithm finds a neighborhood of points (e.g., within a pre-defined radius). The algorithm applies PCA analysis to infer the direction of the local point cloud and its center of mass. The algorithm constructs a line starting at the center of mass and pointing toward the first component. Then the algorithm projects the candidate to this line (the closest point on the line to the candidate).

The algorithm runs several iterations of PCA contraction (each iteration performing contraction on all points). To account for both local and global direction changes of the point cloud, the algorithm performs multi-contraction, such that each iteration is tested on several radii, given in ascending order, and uses the calculation on the radius for which the directionality of the point cloud is the most pronounced. An example of ascending radii, in mm, is {6, 7.5, 9, 10.5, 12, 13.5, 15}. However, radii can be inferred from the minimal and maximal average hit distances.

The test for directionality is the ratio of a primary component to the sum of all components. If the ratio is above a given value, e.g., 0.85, the algorithm stops since it means that, for this locality, the directionality is very pronounced. The contraction of this step produces the 1D centerline points that, after being connected, give the one or more skeleton centerlines of FIGS. 3A and 3B, as described below.

Figure 5:
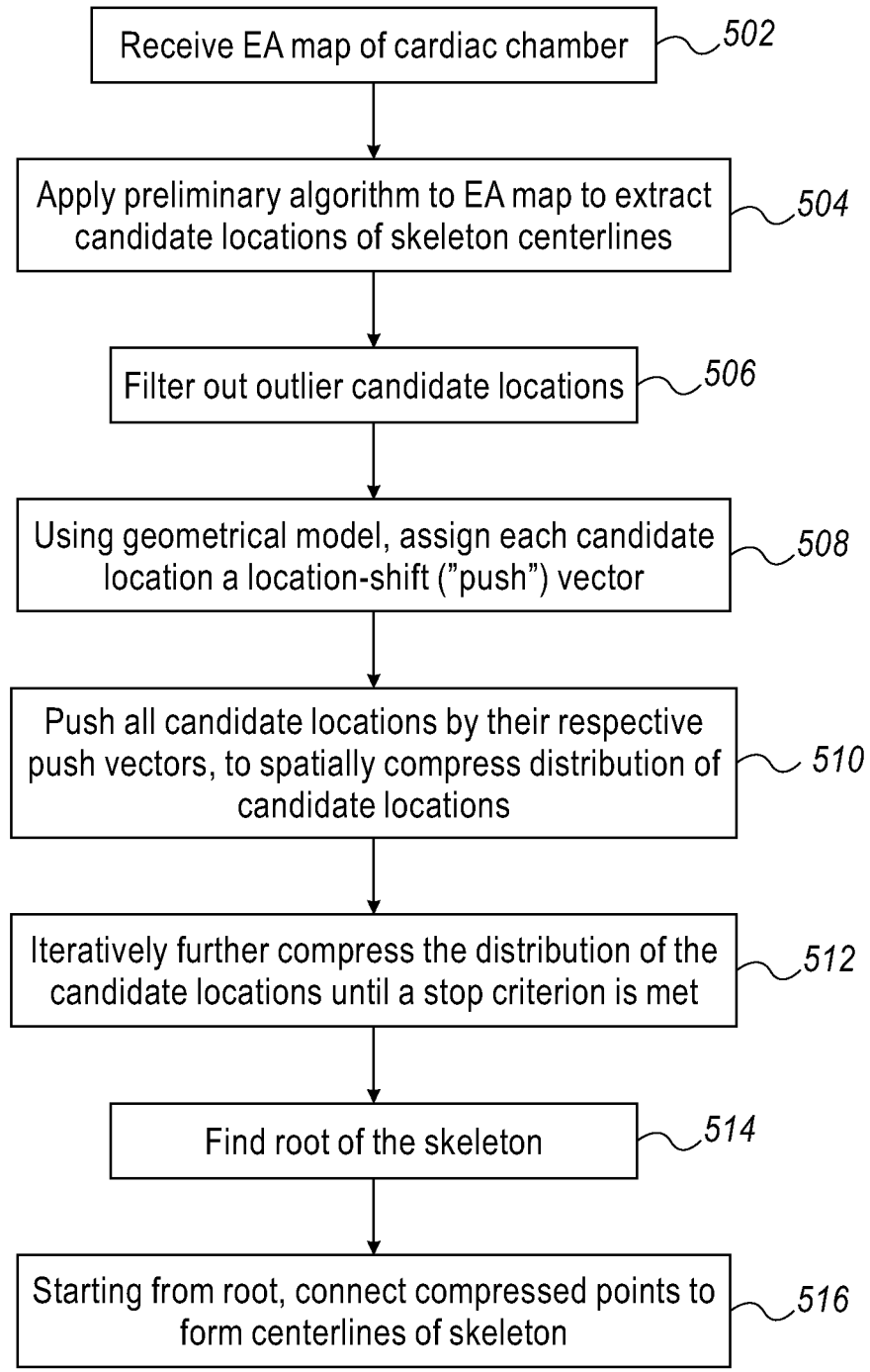
FIG. 5 is a flow chart that schematically describes a method for generating the skeletons of FIGS. 3A and 3B from respective candidate locations of FIGS. 2A and 2B, in accordance with an example of the present disclosure.

FIG. 5 is a flowchart that schematically describes a method for generating the skeletons (312, 314) of FIGS. 3A and 3B from respective candidate locations (212, 214) of FIGS. 2A and 2B, in accordance with an example of the present disclosure. The algorithm, according to the presented example, carries out a process that begins with processor 28 receiving an EA map of a cardiac chamber, at an EA map receiving step 502. The representation of the cardiac chamber in the map is assumed to be complete, i.e., free of "holes". If necessary, the processor may receive an EA map after it was processed to fill any partial volumes, for example using the aforementioned method of U.S. Pat. No. 10,593,112, or it may perform the filling process internally.

Next, at a candidate points extraction step 504, processor 28 applies a preliminary algorithm to the EA map, such as the algorithm of Kerautret et al., applied to EA map 402, to obtain candidate location of a skeleton, such as locations 410 and 412. (The candidate points (212, 214) are seen in full in FIGS. 2A and 2B).

At outlier filtration step 506, processor 28 filters out points that are clearly far away from a center (near the boundary of the reconstruction). An example of such a detected and filtered-out point is of location 412.

Next, step 508 aims at determining a magnitude and a direction to displace each candidate location, which gives a push vector 450 for each candidate location 410. At location-shift ("push") vector determination step 508, processor 28 calculates, for each candidate location, and using the geometrical model described in FIG. 4, an average surface voxel radius, R, which is a pseudo measurement for distance between any candidate location (e.g., locations 410) and closest point on the centerline. The processor further determines a direction, by calculating, for each candidate location, and using PCA described in FIG. 4, the direction to push the candidate point (e.g., direction 446).

Using push vectors 450 that the processor derived in step 508, the processor pushes candidate locations by their respective push vectors, at a pushing step 510, to spatially compress distribution of candidate locations so the skeleton can be formed in later steps.

At a next iterative PCA pushing step 512, processor 28 performs several iterations of PCA contraction, each iteration spatially compressing (e.g., performing contraction on) all candidate locations, as described above. The described contraction produces final candidate centerline locations that are simply 1D curve connectable.

At a root finding step 514, processor 28 finds a root location of the skeleton. The root for the skeleton is a centerline point that satisfies certain properties: proximity to the center of the reconstruction, location around points with orientation aligned with primary orientation of the reconstruction and is not isolated. The centerline point is chosen according to a weighted sum of these measurements. Both center of reconstruction and its first component are computed from the surface of the reconstruction. An example algorithm to find the root includes the following:

For each root candidate point, take a small locality and compute the PCA on the locality and the number of points in the sphere (density proxy) in a form of a weight:

$w_1$=dot(local primary component,surface first principal component)*(number of points)

$w_1$ is the weight that represents a level of alignment of the principal axis 445 associated with the candidate point 410 with primary orientation of reconstruction.

Compute surface center as the weighted average of surface voxels:

$w_2$=$d$(point,center) with $d$ being Euclidean distance.

Calculate Pointweight=$\alpha^* w_1 + \beta^* w_2$. One may use, for example, $\alpha$=0.5 and $\beta$=1.25.

The point with the maximal Point weight is the root.

Finally, at a skeleton formation step 516, processor 28 connects the centerline points according to the following rule: If the distance between adjacent points is less than their minimal hit radius, the processor connects them by a straight line. Otherwise, the processor uses a voxel grid to dilute the adjacent point surroundings until they connect. Then the processor erodes the added voxels without breaking a connectivity.

The processor applies a hierarchical connection: the connection process starts from the root and goes in iterative manner to its neighbors that are closest per direction. The connected points are children in the tree. Then we proceed with connection to points proximal to the children. The nodes in a tree that have more than one child are designated as junctions, and nodes with no children are designated as leaves. The hierarchy of the skeleton tree is built iteratively. When processing a node (skeleton point) the processor looks for the closest points that were not processed, connect it as a child, and find a geometrical path to it. For other neighbors the processor tests whether they are in the same direction as the first; if they are not, they are processed, otherwise, they are processed by other nodes.

The processor then reduces the tree to contain only junctions that have more than one child, and keeps the path from junction to junction. During connection, the processor applies smoothing and noise reduction on the paths for visual esthetics.

The example flow chart shown in FIG. 5 is chosen purely for the sake of conceptual clarity. For example, in alternative examples, the cavity is of an organ other than a heart.

EXAMPLES

Example 1

A method for generating a skeleton (312) in an image of a cavity of an organ of a body includes receiving a map (202) of the cavity, the map comprising surface voxels (405, 406) and interior voxels (410, 412). A subset of the interior voxels is generated, of candidate locations to be on the skeleton. The subset is pruned by removing outlier candidate locations (412). Using a geometrical model including a statistical model, the candidate locations (410) remaining in the pruned subset are spatially compressed. The compressed candidate locations (410) are connected to produce one or more centerlines of the skeleton (312). At least the skeleton is displayed to user.

Example 2

The method according to example 1, wherein removing the outlier candidate locations (412) includes estimating an angular dispersion of generative surface voxels (405) corresponding to a candidate location (412), and removing the candidate location upon finding that the angular dispersion is below a given minimal dispersion value.

Example 3

The method according to example 1, wherein removing the outlier candidate locations (412) includes estimating a variance in a location of a candidate location, and removing the candidate location upon finding that the variance is above a given maximal location variance value.

Example 4

The method according to example 1, wherein spatially compressing the candidate locations (410) includes, for at least some of the candidate locations (i) estimating respective magnitudes and directions (450) of displacement for the candidate locations, (ii) displacing the candidate locations in the respective estimated directions by the respective estimated magnitudes, and (iii) iteratively performing further statistical spatial compression of one or more of the candidate locations.

Example 5

The method according to example 4, wherein estimating a magnitude of displacement for a candidate location (410) includes applying an optimization algorithm to calculate an average distance of the candidate location from its generating surface voxels (406).

Example 6

The method according to example 5, wherein performing the further statistical spatial compression includes defining a region of interest (ROI) (444) comprising a subset of candidate locations for the further statistical spatial compression.

Example 7

The method according to example 5, wherein a volume of the ROI (444) monotonically decreases with iteration number.

Example 8

The method according to any of examples 5 through 7, wherein, estimating a direction of displacement for a candidate location includes (i) estimating a spatial distribution of the candidate location using one of Principal Component Analysis (PCA) and regression analysis, and (ii) estimating the direction based on the estimated spatial distribution.

Example 9

The method according to any of examples 5 through 8, wherein, iteratively performing the further statistical spatial compression includes stopping iterations of the further statistical spatial compression when a directionality measure of a spatial distribution of candidate locations exceeds a predefined value.

Example 10

The method according to any of examples 5 through 9, wherein the directionality measure is given as the eccentricity of an ellipsoid used as a region of interest (ROI) in the statistical spatial compression model.

Example 11

The method according to example 1, wherein connecting the compressed candidate locations (410) includes finding a root location among the candidate locations and hierarchically connecting the candidate locations starting at the root.

Example 12

A system 20 for generating a skeleton in an image of a cavity of an organ of a body, the system including a memory (33) and a processor (28). The memory (33) is configured to store a map (202) of the cavity, the map comprising surface voxels (405, 406) and cavity voxels (410, 412). The processor is configured to (i) generate a subset of the interior voxels that are candidate locations (410) to be on the skeleton, (ii) prune the subset by removing outlier candidate locations, (iii) using a geometrical model comprising a statistical model, spatially compress the candidate locations remaining in the pruned subset, (iv) connect the compressed candidate locations to produce one or more centerlines of the skeleton (202), and (v) display at least the skeleton to user.

Although the examples described herein mainly address pulmonary vein isolation, the methods and systems described herein can also be used in other applications, such as in pulmonary veins segmentation and identification on an EP map, endoscopic-view based navigation, automatic map-to-map/map-to-image registration, and automatic resolution for fast anatomical mapping.

It will thus be appreciated that the examples described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for generating a skeleton in an image of a cavity of an organ of a body, the method comprising:
    receiving a map of the cavity, the map comprising surface voxels and interior voxels;
    generating a subset of the interior voxels that are candidate locations to be on the skeleton;
    pruning the subset by removing outlier candidate locations based on at least one of an angular dispersion of generative surface voxels or a variance in location of the candidate locations;
    using a geometrical model comprising a statistical model, spatially compressing the candidate locations remaining in the pruned subset;
    connecting the compressed candidate locations to produce one or more centerlines of the skeleton; and
    displaying at least the skeleton to user.

2. The method according to claim 1, wherein removing the outlier candidate locations comprises estimating the angular dispersion of generative surface voxels corresponding to a candidate location, and removing the candidate location upon finding that the angular dispersion is below a given minimal dispersion value.

3. The method according to claim 1, wherein removing the outlier candidate locations comprises estimating the variance in a location of a candidate location, and removing the candidate location upon finding that the variance is above a given maximal location variance value.

4. The method according to claim 1, wherein spatially compressing the candidate locations comprises, for at least some of the candidate locations:
    estimating respective magnitudes and directions of displacement for the candidate locations;
    displacing the candidate locations in the respective estimated directions by the respective estimated magnitudes; and
    iteratively performing further statistical spatial compression of one or more of the candidate locations.

5. The method according to claim 4, wherein estimating a magnitude of displacement for a candidate location comprises applying an optimization algorithm to calculate an average distance of the candidate location from its generating surface voxels.

6. The method according to claim 4, wherein performing the further statistical spatial compression comprises defining a region of interest (ROI) comprising a subset of candidate locations for the further statistical spatial compression.

7. The method according to claim 6, wherein a volume of the ROI monotonically decreases with iteration number.

8. The method according to claim 4, wherein estimating a direction of displacement for a candidate location comprises:
    estimating a spatial distribution of the candidate location using one of Principal Component Analysis (PCA) and regression analysis; and
    estimating the direction based on the estimated spatial distribution.

9. The method according to claim 4, wherein iteratively performing the further statistical spatial compression comprises stopping iterations of the further statistical spatial compression when a directionality measure of a spatial distribution of candidate locations exceeds a predefined value.

10. The method according to claim 9, wherein the directionality measure is given as an eccentricity of an ellipsoid used as a region of interest (ROI) in the statistical spatial compression model.

11. The method according to claim 4, wherein connecting the compressed candidate locations comprises finding a root location among the candidate locations and hierarchically connecting the candidate locations starting at the root.

12. A system for generating a skeleton in an image of a cavity of an organ of a body, the system comprising:
    a memory configured to store a map of the cavity, the map comprising surface voxels and cavity voxels; and
    a processor, which is configured to:
        generate a subset of the interior voxels that are candidate locations to be on the skeleton;
        prune the subset by removing outlier candidate locations based on at least one of an angular dispersion of generative surface voxels or a variance in location of the candidate locations;
        using a geometrical model comprising a statistical model, spatially compress the candidate locations remaining in the pruned subset;
        connect the compressed candidate locations to produce one or more centerlines of the skeleton; and
        display at least the skeleton to user.

13. The system according to claim 12, wherein the processor is configured to remove the outlier candidate locations by estimating the angular dispersion of generative surface voxels corresponding to a candidate location, and removing the candidate location upon finding that the angular dispersion is below a given minimal dispersion value.

14. The system according to claim 12, wherein the processor is configured to remove the outlier candidate locations by estimating the variance in a location of a candidate location, and removing the candidate location upon finding that the variance is above a given maximal location variance value.

15. The system according to claim 12, wherein the processor is configured to spatially compress the candidate locations by, for at least some of the candidate locations:
    estimating respective magnitudes and directions of displacement for the candidate locations;
    displacing the candidate locations in the respective estimated directions by the respective estimated magnitudes; and
    iteratively performing further statistical spatial compression of one or more of the candidate locations.

16. The system according to claim 15, wherein the processor is configured to estimate a magnitude of displacement for a candidate location by applying an optimization algorithm to calculate an average distance of the candidate location from its generating surface voxels.

17. The system according to claim 15, wherein the processor is configured to perform the further statistical spatial compression by defining a region of interest (ROI) comprising a subset of candidate locations for the further statistical spatial compression.

18. The system according to claim 17, wherein a volume of the ROI monotonically decreases with iteration number.

19. The system according to claim 15, wherein the processor is configured to estimate a direction of displacement for a candidate location by:
   estimating a spatial distribution of the candidate location using one of Principal Component Analysis (PCA) and regression analysis; and
   estimating the direction based on the estimated spatial distribution.

20. The system according to claim 15, wherein the processor is configured to iteratively perform the further statistical spatial compression by stopping iterations of the further statistical spatial compression when a directionality measure of a spatial distribution of candidate locations exceeds a predefined value.

21. The system according to claim 20, wherein the directionality measure is given as an eccentricity of an ellipsoid used as a region of interest (ROI) in the statistical spatial compression model.

22. The system according to claim 15, wherein the processor is configured to connect the compressed candidate locations by finding a root location among the candidate locations and hierarchically connecting the candidate locations starting at the root.

* * * * *